United States Patent
Pflueger et al.

(10) Patent No.: US 10,282,395 B2
(45) Date of Patent: May 7, 2019

(54) HANDLING TIMER-BASED RESIZING EVENTS BASED ON ACTIVITY DETECTION

(71) Applicants: Jens Pflueger, Karlsruhe (DE); Frank Weigel, Saarbruecken (DE); Andreas Kunz, Karlsruhe (DE)

(72) Inventors: Jens Pflueger, Karlsruhe (DE); Frank Weigel, Saarbruecken (DE); Andreas Kunz, Karlsruhe (DE)

(73) Assignee: SAP SE, Walldorf (DE)

( * ) Notice: Subject to any disclaimer, the term of this patent is extended or adjusted under 35 U.S.C. 154(b) by 510 days.

(21) Appl. No.: 14/226,379

(22) Filed: Mar. 26, 2014

(65) Prior Publication Data

US 2015/0143225 A1 May 21, 2015

Related U.S. Application Data

(60) Provisional application No. 61/904,590, filed on Nov. 15, 2013.

(51) Int. Cl.
 G06F 17/22 (2006.01)
 G06F 17/21 (2006.01)

(52) U.S. Cl.
 CPC ........ G06F 17/2247 (2013.01); G06F 17/211 (2013.01)

(58) Field of Classification Search
 CPC ....... G06F 17/211; G06F 3/14; G06F 17/2247
 See application file for complete search history.

(56) References Cited

U.S. PATENT DOCUMENTS

| | | | |
|---|---|---|---|
| 6,952,620 B2 | 10/2005 | Cherdron et al. | |
| 7,050,056 B2 | 5/2006 | Meyringer | |
| 7,225,424 B2 | 5/2007 | Cherdron et al. | |
| 7,302,648 B1 * | 11/2007 | Brunner | G06F 3/0481 715/788 |
| 7,581,204 B2 | 8/2009 | Reeder et al. | |

(Continued)

FOREIGN PATENT DOCUMENTS

| | | |
|---|---|---|
| EP | 02024244 | 10/2002 |
| EP | 1622043 B1 | 2/2006 |
| EP | 2642718 A2 | 9/2013 |

OTHER PUBLICATIONS

U.S. Appl. No. 13/904,561, filed May 29, 2013, Andreas Kunz.

*Primary Examiner* — Manglesh M Patel
*Assistant Examiner* — Nicholas Hasty
(74) *Attorney, Agent, or Firm* — Fish & Richardson P.C.

(57) ABSTRACT

Computer-implemented methods, media, and systems implemented to handling timer-based resizing events based on activity detection can trigger a start of a resize timer. The resize timer can periodically provide a notification to check for resize activity in a user interface displayed on a display device. In response to the notification, an absence of the resize activity can be determined after a threshold inactivity time period has expired from the start of the resize timer. In response, a stop of the resize timer can be triggered. After triggering the stop, a first resize activity associated with a first timestamp can be detected in the user interface. A restart of the resize timer from the first timestamp can be triggered to periodically provide the notification to check for resize activity in the user interface. Subsequent continuation or stopping of the resize timer can be based on further presence or absence of resize activity.

20 Claims, 4 Drawing Sheets

(56) References Cited

U.S. PATENT DOCUMENTS

| | | | |
|---|---|---|---|
| 7,600,014 B2 * | 10/2009 | Russell | H04L 69/329 |
| | | | 709/223 |
| 7,600,215 B2 | 10/2009 | Cherdron et al. | |
| 7,797,370 B2 | 9/2010 | Brunswig et al. | |
| 7,925,968 B2 | 4/2011 | Fischer et al. | |
| 8,018,473 B2 | 9/2011 | Sylthe et al. | |
| 8,307,300 B1 * | 11/2012 | Fisher | G06F 9/542 |
| | | | 345/531 |
| 8,380,648 B2 | 2/2013 | Matson et al. | |
| 8,407,297 B2 | 3/2013 | Schmidt-Karaca et al. | |
| 8,463,075 B2 | 6/2013 | Bastide et al. | |
| 8,474,820 B2 | 7/2013 | Walker et al. | |
| 8,566,699 B2 | 10/2013 | Tomasic et al. | |
| 8,620,770 B1 | 12/2013 | Pope | |
| 8,645,300 B1 | 2/2014 | Cowdrey et al. | |
| 8,645,823 B1 | 2/2014 | Thiess | |
| 2003/0237044 A1 | 12/2003 | Hayer et al. | |
| 2004/0088210 A1 | 5/2004 | Tsyganskiy | |
| 2005/0076311 A1 | 4/2005 | Kusterer et al. | |
| 2006/0010229 A1 | 1/2006 | Chen et al. | |
| 2007/0234195 A1 * | 10/2007 | Wells | G06F 17/30905 |
| | | | 715/205 |
| 2008/0215966 A1 * | 9/2008 | Suarez | G06F 17/30905 |
| | | | 715/252 |
| 2009/0282349 A1 * | 11/2009 | Olsen | G06F 9/4443 |
| | | | 715/760 |
| 2011/0078203 A1 | 3/2011 | Cohen et al. | |
| 2011/0148878 A1 | 6/2011 | Baikie | |
| 2011/0209159 A1 | 8/2011 | Baratz et al. | |
| 2011/0252305 A1 | 10/2011 | Tschäni et al. | |
| 2011/0298724 A1 | 12/2011 | Ameling et al. | |
| 2012/0158693 A1 | 6/2012 | Papadimitriou et al. | |
| 2012/0235938 A1 * | 9/2012 | Laubach | G06F 3/0416 |
| | | | 345/173 |
| 2013/0007147 A1 | 1/2013 | Toga et al. | |
| 2013/0080641 A1 | 3/2013 | Lui et al. | |
| 2013/0212462 A1 | 8/2013 | Athas et al. | |
| 2013/0239028 A1 | 9/2013 | Forutanpour et al. | |
| 2014/0013203 A1 | 1/2014 | Rogoveanu | |

* cited by examiner

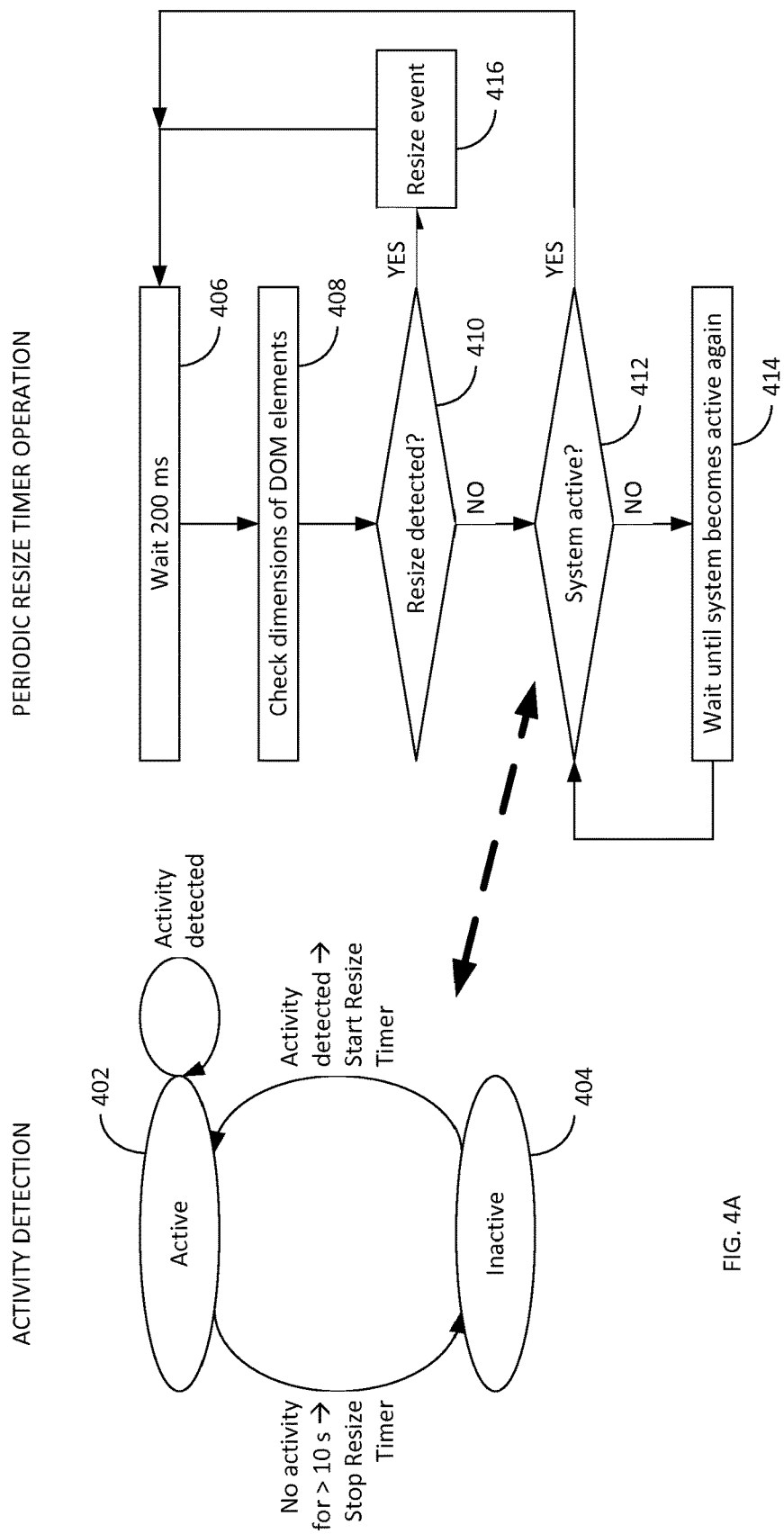

HANDLING TIMER-BASED RESIZING EVENTS BASED ON ACTIVITY DETECTION

CLAIM OF PRIORITY

This application claims priority under 35 USC § 119(e) to U.S. Patent Application Ser. No. 61/904,590 filed on Nov. 15, 2013, the entire contents of which are hereby incorporated by reference.

TECHNICAL FIELD

The present disclosure relates to software, computer systems, and computer-implemented methods for handling resizing events, e.g., in user interface windows.

BACKGROUND

A Data Object Model (DOM) is an application programming interface (API) which is valid for HyperText Markup Language (HTML) documents and certain Extensible Markup Language (XML) documents. A HTML document includes elements and their content arranged in a hierarchical structure. The elements of an HTML document can include, e.g., structural elements, head elements, list elements, text formatting elements, and other elements. The DOM defines the logical structure for such a document and a way in which the document can be accessed and manipulated. The DOM enables building documents, navigating structures of the documents, and modifying (e.g., adding, deleting, editing) content in the documents. The multiple elements in an HTML document are arranged in the hierarchical structure (e.g., as root elements, node elements, child elements) defined by the DOM. Each element in the DOM is associated with multiple parameters including, e.g., an element identifier, an element tag name, an element class name, an element object collection, and other parameters.

Computer software applications that provide user interfaces, e.g., Internet browsers, can execute a computer software application to render a HTML document, e.g., as a webpage of a website. The software application can be configured to receive inputs, e.g., a selection of a HTML element displayed in a user interface, and to responsively provide outputs, e.g., execution of an event responsive to the input. Examples of HTML events can include a clicking of a mouse, a loading of a web page, a loading of an image, a mouse over, a change in an input field, and other inputs. A resize event is another example of a HTML event. The resize event can be applicable to an entire HTML document, e.g., the entire Internet browser window, or to one or more elements included in the HTML document.

SUMMARY

This disclosure describes computer-implemented methods, computer-readable media and computer systems for handling timer-based resizing events based on activity detection.

In general, one innovative aspect of the subject matter described here can be implemented as a method performed by data processing apparatus. A start of a resize timer is triggered. The resize timer is configured to periodically provide a notification to check for resize activity in a user interface displayed on a display device. In response to the notification, it is determined that there has been an absence of the resize activity in the user interface after a threshold inactivity time period has expired from the start of the resize timer. In response to determining the absence of the resize activity in the user interface after the threshold inactivity time period has expired, a stop of the resize timer is triggered. A resize activity is detected in the user interface after triggering the stop of the resize timer. A restart of the resize timer from the first timestamp is triggered to periodically provide the notification to check for resize activity in the user interface.

This, and other aspects, can include one or more of the following features. The detected resize activity can be associated with a first timestamp at which the resize activity was detected. In response to the notification, a second timestamp at which the restart of the restart timer was triggered can be identified. A time difference between the first timestamp and the second timestamp can be compared with the threshold inactivity time period. It can be determined that the time difference is greater than the threshold inactivity time period. It can be determined whether resize activity was present or absent after the second timestamp. In response to determining that the time difference is greater than the threshold inactivity time period, it can be determined that resize activity was absent after the second timestamp. It can be determined that the threshold inactivity time period from the second timestamp has expired. The stop of the resize timer can be triggered after the threshold inactivity time period has expired from the second timestamp in response to determining the absence of resize activity after the second timestamp. In response to determining that the time difference is greater than the threshold inactivity time period, a presence of resize activity after the second timestamp can be determined. The resize timer can continue to be executed from the second timestamp to periodically provide the notification to check for resize activity in the user interface. The resize timer can define a resize time interval to periodically check for resize activity in the user interface. Continuing to execute the resize timer from the second timestamp can include executing the resize timer at the same resize interval. Continuing to execute the resize timer from the second timestamp can include increasing the resize time interval for successive checks for the resize activity. It can be determined that the time difference is less than the threshold inactivity time period. In response to determining that the time difference is less than the threshold inactivity time period, the resize timer can continue to be executed from the second timestamp to periodically provide the notification to check for resize activity in the user interface displayed on the display device. The resize time defined by the resize timer can be constant regardless of the type of resize activity. The precise time can be variable according to a type of the size activity. The type of resize activity can be at least one off and internal input to perform a resizing or an external input to perform a resizing.

Another innovative aspect of the subject matter described here can be implemented as a non-transitory computer readable medium storing computer instructions executable by data processing apparatus to perform operations described here. A further innovative aspect of the subject matter described here can be implemented as a system comprising data processing apparatus and a computer readable medium storing instructions executable by the data processing apparatus to perform the operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DESCRIPTION OF DRAWINGS

FIGS. 4A and 4B are flowcharts of example processes for operating the resize timer based on activity or inactivity of a computer system.

Like reference numbers and designations in the various drawings indicate like elements.

DETAILED DESCRIPTION

Figure 1:
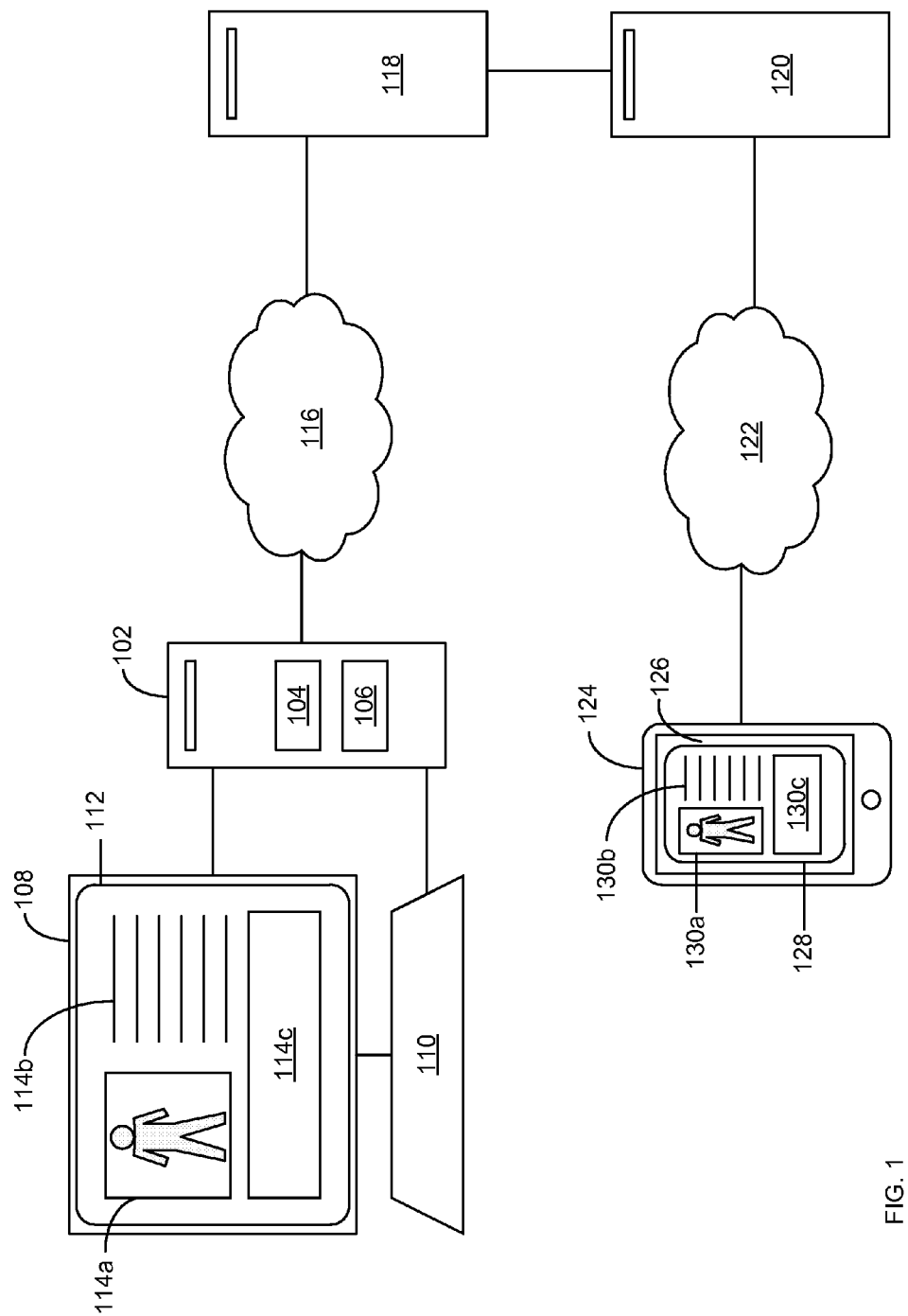
FIG. 1 is a schematic diagram of an example computer system displaying DOM elements on a display device.

This disclosure relates to computer-implemented methods, computer-readable media and computer systems for handling timer-based resizing events based on activity detection. Generally, a resize event for an entire document (e.g., HTML document, XML document, or other document) rendered by a computer software application (e.g., an Internet browser) is supported across browsers (e.g., Windows® Internet Explorer™, Google® Chrome™, or other browsers). However, standardized detection of a resize event associated with an individual, arbitrary DOM element across multiple browsers may be difficult. One method to implement standardized detection of the resize event of an individual DOM element is to associate a resize timer with the DOM element. The resize timer can periodically check previous and current dimensions of the DOM element. If the check reveals that a size of the DOM element has changed, then the computer software application is informed via an event. Because the resize timer is executed for almost an entire duration of the application being executed (e.g., a browser window being open), system resources are continuously consumed. When such a technique is implemented on a mobile computer system (e.g., a smartphone, a tablet computer, a personal digital assistant, or other mobile computer system), battery power can be consumed and drained. Moreover, it may not be possible to activate a sleep mode of the mobile computer system as long as the resize timer is executing.

This disclosure relates to combining a timer-based resizing mechanism and activity detection to implement a resize event. In some implementations, the execution of the resize timer which periodically checks for a presence or absence of a resize activity can be stopped after a certain time of inactivity, as described below. When an action occurs which may have side effects on a user interface (e.g., an Internet browser) displayed on a display device, operations can be implemented in response to the action based in part, on a time at which the action occurred. For example, when a DOM event, a DOM manipulation, an Ajax response (or other event) is detected, a function can be called to "a previous activity" timestamp which represents a time at which a previous resize activity occurred. The resize timer stops executing if a time of occurrence of the previous resize activity and a time of occurrence of the current resize timer is greater than a specified inactivity time period. That is, the resize timer notices when the last resize activity occurred at a time greater than the threshold inactivity time period. An event is fired when an activity is recognized again. Firing the event causes the resize timer to be restarted.

Combining the timer-based resize mechanism and the activity detection to implement a resize event can decrease a duration for which a resize timer executes. Such a decrease can result in a decrease in system resources that are consumed to execute the resize timer. The decrease can also result in a decrease in battery power consumed in implementations on mobile computer systems, thereby increasing a duration for which such systems are available for use without requiring a recharge. In addition, the techniques described here to handle timer-based resizing based on activity detection can be implemented across different platforms, each of which implements different computer software applications (e.g., different Internet browsers) to render documents arranged according to DOMs. Sometimes, the operation of the resize timer can interfere with activities such as animations, making the animations less smooth. By decreasing a duration for which the resize timer executes, interference with such activities can also be decreased or eliminated.

FIG. 1 is a schematic diagram of an example computer system 102 displaying DOM elements on a display device. In some implementations, the computer system 102 can be a desktop computer system, a laptop computer system, a tablet computer system, a smartphone, a personal digital assistant (PDA) or other computer system. The computer system 102 can include (or be connected to) a computer-readable medium 104 that stores computer instructions executable by data processing apparatus (e.g., one or more processors 106) to perform operations described here. The computer system 102 can be connected to one or more output devices, e.g., display device 108, and one or more input devices, e.g., a keyboard 110, a mouse, a touchscreen, a stylus, or other input devices.

The computer system 102 can be connected to a server computer system 118 over one or more wired or wireless networks 116, e.g., the Internet. The server computer system 118 can store (e.g., host), among other things, a document arranged according to a DOM (e.g., a HTML document, an XML document, or other DOM-based document). The computer system 102 can request and receive the document from the server computer system 118. The computer system 102 can execute functionalities (e.g., computer software application) that can interpret the DOM associated with the received document, and render the DOM elements in the document in a user interface 112 according to the hierarchical structure defined by the DOM. The DOM elements can include a first DOM element 114a (e.g., an image), a second DOM element 114b (e.g., text), a third DOM element 114c (e.g., an embedded video file), or other DOM elements.

In some implementations, the computer system 102 implements the techniques described here to handle timer-based resizing events based on activity detection. Similar techniques can be implemented by one or more other computer systems, e.g., a mobile computer system 124, such as a tablet computer, a smartphone, a PDA, or other mobile computer systems. A mobile computer system can include a computer system that is operable under battery power alone. For example, the mobile computer system 124 can include (or be connected to) a computer-readable medium (not shown) that stores computer instructions executable by one or more processors (not shown) to perform operations described here. The mobile computer system 124 can be connected to a server computer system 120 over one or more wired or wireless networks 122, e.g., the Internet. Similar to the server computer system 118, the server computer system 122 can store (e.g., host) a document arranged according to a DOM. The mobile computer system 124 can execute one or more computer software applications to receive and render the document in a display device 126. For example, in the display device 126, the mobile computer system 124 can display one or more DOM elements. The DOM elements can include a first DOM element 130*a* (e.g., an image), a second DOM element 130*b* (e.g., text), a third DOM element 130*c* (e.g., an embedded audio file), and other DOM elements.

Each of the computer system 102 and the mobile computer system 124 can implement respective one or more computer software applications to render the document according to the DOM in the respective display devices. In some implementations, the one or more computer software applications that the computer system 102 executes and those that the mobile computer system 124 executes can be the same. In some implementations, the computer software applications can be different. For example, the computer system 102 and the mobile computer system 124 can execute different user interface browsers or other computer software applications to render HTML or XML documents in user interfaces. Despite the differences in the executable computer software applications, each of the computer system 102, the mobile computer system 124, and any other computer system can be configured to implement the techniques described below with reference to FIGS. 2 and 3 to handle timer-based resizing events based on activity detection.

Figure 2:
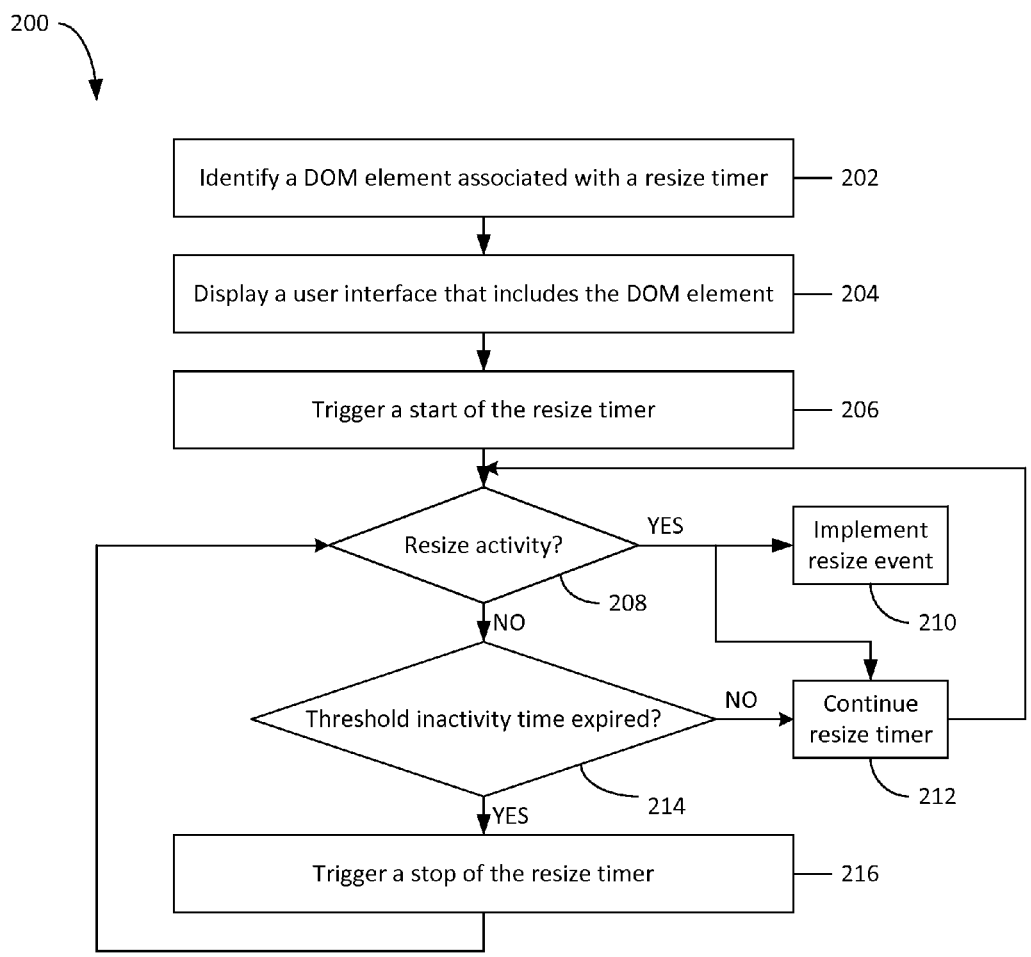
FIG. 2 is a flowchart of an example process for handling timer-based resizing events based on activity detection.

FIG. 2 is a flowchart of an example process 200 for handling timer-based resizing events based on activity detection. The process 200 can be implemented as computer instructions stored on a computer-readable medium and executed by data processing apparatus. For example, the process 200 can be implemented either by the computer system 102 or the mobile computer system 124, each executing the same or different computer software applications.

At 202, a DOM element with which a resize timer is associated can be identified. In some implementations, the HTML document and the application logic to implement (e.g., present) the HTML document in a user interface can be stored on the server computer system 118, e.g., by a publisher of the HTML document. In response to receiving a request from the computer system 102, the server computer system 118 can transmit the HTML document and the application logic to the computer system 102. The computer system 102 can execute one or more computer software applications (e.g., Internet browser applications) to implement the HTML document according to the application logic, and display the DOM elements included in the HTML document in the user interface 112. In some instances, all or portions of the HTML document or other data used to display the DOM elements in the user interface 112 can be created dynamically by the one or more computer software applications executed by the computer system 102. The computer system 102 can identify the DOM element with which the resize timer is to be associated in response to executing the one or more computer software applications that implement the application logic. In this manner, the DOM element (or elements) with which the resize timer is to be associated can be identified at runtime by the one or more computer software applications that implement the application logic to present the HTML document. In some implementations, the server computer system 118 can store an indication that one or more DOM elements are associated with a resize timer. In response to receiving a request for the HTML document from the computer system 102, the server computer system 118 can transmit the HTML document, the resize timer, and an identification of the DOM element (or elements) with which the resize timer is associated to the computer system 102.

At 204, a user interface that includes the DOM element with which the resize timer is associated can be displayed. In some implementations, the computer system 102 can receive the HTML document, and display the DOM elements in the HTML document in the user interface 112 of the display device 108 according to the DOM that represents the hierarchical structure associated with the HTML document. For example, the user interface 112 can be displayed when a user launches the computer software application that renders the user interface. Alternatively, or in addition, the user interface 112 can be displayed when a user provides a Uniform Resource Locator (URL) that references the HTML document.

At 206, a start of the resize timer is triggered. The resize timer can be implemented as a computer software application configured to periodically provide a notification to check for resize activity in the user interface 112. In some implementations, the computer system 102 can execute the resize timer in response to the HTML document being displayed in the user interface 112, in response to resizing activity being detected for a DOM element identified as described above, or combinations of them. Alternatively, or in addition, the computer system 102 can execute the resize timer in response to the computer system 102 creating a DOM element (or elements). The computer system 102 can create the DOM element (or elements) at a certain time after displaying the user interface 112, e.g., in response to user input, such as a selection of a certain sub-view inside the user interface. Such DOM elements may also be destroyed/deleted, e.g., if the user closes the user interface 112, changes the sub-view, causes different DOM elements to be displayed (or combinations of them). For example, the computer system 102 can execute the resize timer to check for resizing activity of an identified DOM element once every 200 ms (or other time interval).

At 208, a check can be performed for a presence or absence of resize activity associated with the user interface. For example, upon the expiration of the time interval associated with the resize timer, the computer system 102 can receive a notification to check for a resize activity of a DOM element identified as described above. In response, the computer system 102 can compare current dimensions (e.g., a height, width, or other dimensions) of an identified DOM element with previous dimensions of the identified DOM element. The previous dimensions of the identified DOM element can be the dimensions that the computer system 102 identified in response to previously receiving a notification to check for a resize activity of the DOM element.

In some implementations, the computer system 102 can determine a presence of resize activity (decision branch "YES" at 208). Resize activity can occur in response to external reasons. For example, the computer system 102 can determine that the resize has activity has occurred in response to a user providing an input to change a size of the user interface 112 or a size of a DOM element displayed in the user interface (e.g., the first DOM element 114*a*, the second DOM element 114*b*, the third DOM element 114*c*), combinations of them, or other input. The input can include a resizing of the user interface 112 using an input device, e.g., a mouse, stylus, keyboard, or other input device. Alternatively, or in addition, the input can include a touch input, e.g., a pinch and zoom, a pinch and shrink, a double tap, or other touch input on a touchscreen. In another example, the input can include a change in orientation of the display device 108, e.g., from a first orientation, such as a portrait orientation, to a second orientation, such as a landscape orientation, or vice versa.

Alternatively, or in addition, resize activity can occur in response to internal reasons. For example, the HTML document can be encoded such that a child element is resized in response to a parent element being resized. In another example, the HTML document can be encoded such that the parent element is resized in response to a child element being resized. In these examples, the child element or the parent element can be resized in response to external reasons such as those described above. Thus, the internal reasons can represent a size adaptation, e.g., by resizing, of certain DOM elements displayed in the user interface 112 in response to resizing of other DOM elements displayed in the user interface 112. Further examples of determining the presence of resize activity includes other DOM events, DOM manipulations, Ajax responses, to name a few.

In some implementations, the interval associated with the resize timer can be the same regardless of the reason for the resize activity. For example, regardless of whether the reason for the resizing is external or internal, the time interval associated with the resize timer can be the same (such as 200 ms). In some implementations, different intervals can be associated with reasons for the resize activity. For example, if the input to resize a DOM element is external, such as a user input, then the time interval associated with the resize timer can be different relative to if the input to resize the DOM element is internal. Thus, if the mobile computer system 124 detects that a user has changed an orientation of the mobile computer system 124, then the mobile computer system 124 can associate a time interval of 200 ms to the resize timer, and provide notifications to check for further resize activity once every 200 ms. Alternatively, if the mobile computer system 124 detects a resizing of a child DOM element because a parent DOM element has changed in size, then the mobile computer system 124 can associate a relatively greater time interval of 400 ms to the resize timer, and provide notifications to check for further resize activity once every 400 ms. In this manner, the computer system 102 (or the mobile computer system 124 or both) can rank reasons for resize activities, and associate different time intervals based on the rank.

At 210, a resize event can be implemented in response to determining a presence of resize activity. In some implementations, in response to the computer system 102 determining that dimensions of the first DOM 114*a* element have changed relative to previous dimensions of the first DOM element 114*a,* the computer system 102 can fire a resize event so that one or more other DOM elements displayed in the user interface 112 can adapt to the change in dimensions. For example, the computer system 102 can change the dimensions of one or more or all of the other DOM elements, as necessary, to adapt to the change in dimensions of the first DOM element 114*a*.

At 212, the execution of the resize timer can be continued. For example, the computer system 102 can continue to execute the resize timer in response to determining the presence of resize activity at 210. Alternatively, or in addition, the computer system 102 can continue to execute the resize timer after implementing the resize event at 210. In this manner, in response to and after detecting the presence of resize activity, the computer system 102 can continue to periodically detect for the presence of resize activity. If the computer system 102 detects the presence of resize activity, the computer system 102 can execute the resize event and continue to execute the resize timer.

In some implementations, in response to checking for activity at 208, the computer system 102 can determine an absence of resize activity (decision branch "NO" at 208). For example, at a first time instant t1, the computer system 102 can determine an absence of any input to resize one of the identified DOM elements. The computer system 102 can continue to execute the resize timer for the time interval (e.g., 200 ms) until a second time instant t2 is reached. At the second time instant t2, the computer system 102 can once again determine an absence of any input to resize one of the identified DOM elements. In this manner, the computer system 102 can continue to determine an absence of resize activity at multiple consecutive time instants (e.g., t3, t4, t5, and so on).

The computer system 102 can define a threshold inactivity time (e.g., 10 s, or other time). In some situations, the threshold inactivity time can be defined from a time at which the resize timer began execution. In some situations, the threshold inactivity time can be defined from a time at which a presence of previous resize activity was detected. The threshold inactivity time represents a sufficient time for which no resize activity has been detected.

In response to determining an absence of resize activity at 208, a check can be performed to determine if the threshold inactivity time has expired at 214. In some implementations, in response to determining an absence of a resize activity, the computer system 102 can determine if a presence of resize activity was previously detected. If the presence of resize activity was previously detected, then the computer system 102 can identify the time at which the presence of the resize activity was previously detected. The computer system 102 can determine if a difference between a current time and the identified time is greater than or equal to the threshold inactivity time. Alternatively, if the computer system 102 determines an absence of any previous resize activity, then the computer system 102 can determine if a difference between the current time and a time at which the resize timer started to execute is greater than or equal to the threshold inactivity time. If it is determined that the threshold inactivity time has not expired (decision branch "NO"), at 212, the execution of the resize timer can be continued. For example, if the computer system 102 determines that the difference is not greater than or equal to the threshold inactivity time, then the computer system 102 can continue to execute the resize timer.

If, on the other hand, it is determined that the threshold inactivity time has expired (decision branch "YES"), at 216, a stop of the resize timer can be triggered. In this manner, when the computer system 102 determines an absence of resize activity for a duration greater than the threshold inactivity time, the computer system 102 stops executing the resize timer. Doing so can preserve system resources that would otherwise have been expended had the computer system 102 continued to execute the resize timer beyond the expiration of the threshold inactivity time. Having ceased to execute the resize timer under these conditions, the computer system 102 can continue to determine the presence or absence of resize activity at 208. In some implementations, the computer system 102 can either restart or not restart the resize timer as described below with reference to FIG. 3.

Figure 3:
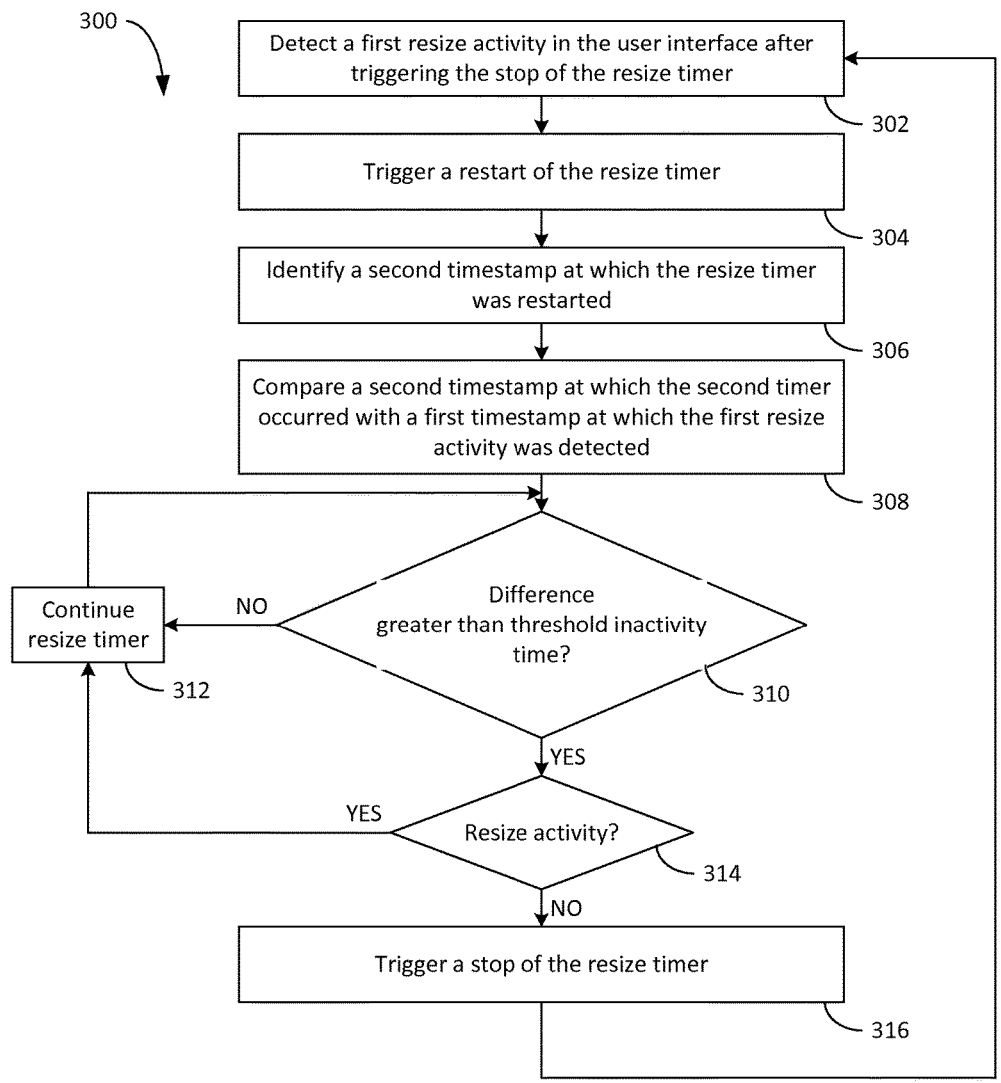
FIG. 3 is a flowchart of an example process for starting or stopping a resize timer based on inactivity for a period of time.

FIG. 3 is a flowchart of an example process 300 for starting or stopping a resize timer based on inactivity for a period of time. The process 300 can be implemented as computer instructions stored on a computer-readable medium and executed by data processing apparatus. For example, the process 300 can be implemented either by the computer system 102 or the mobile computer system 124, each executing the same or different computer software applications.

At 302, a first resize activity can be detected in the user interface after triggering the stop of the resize timer. For example, the computer system 102 can determine that a resize activity has occurred in response to either external reasons or internal reasons or both, as described above. The first resize activity can be associated with a first timestamp that represents a time at which the first resize activity was detected.

At 304, a restart of the resize timer can be triggered. For example, in response to detecting the first resize activity, the computer system 102 can restart execution of the resize timer. The restarted resize timer can begin to periodically provide a notification to check for resize activity in the user interface 112 displayed on the display device 108.

At 306, a second timestamp at which the restart of the resize timer occurred can be identified. At 308, the second timestamp at which the resize timer was restarted can be compared with the first timestamp at which the first resize activity was detected. For example, the computer system 102 can determine a difference between the second timestamp and the first timestamp resulting in a time period.

At 310, a check can be performed to determine if the difference is greater than the threshold inactivity time. For example, the computer system 102 can determine if the time period that resulted from the difference between the second timestamp and the first timestamp is greater than the threshold inactivity time (e.g., 10 s) described above.

If the difference is less than the threshold inactivity time (decision branch "NO" at 310), then, at 312, the resize timer can continue to be executed. For example, if the computer system 102 determines that the previous resize activity was detected 5 s before the restart of the resize timer, then the computer system 102 can determine that the difference between the second timestamp and the first timestamp (i.e., 5 s, in this example) is less than the threshold inactivity time (i.e., 10 s, in this example). In response, the computer system 102 can continue to execute the resize timer.

In some implementations, the computer system 102 can continue to execute the resize timer at the same time interval. That is, the computer system 102 can execute the resize timer to provide a notification to check for resize activity once every 200 ms. In this example, the computer system 102 can execute the resize timer five times in one second (i.e., once every 200 ms).

In some implementations, the computer system 102 can gradually increase the time interval associated with the resize timer. For example, at a first instance of continuing to execute the resize timer in response to determining that the difference between the second timestamp and the first timestamp is less than the threshold inactivity time, the computer system 102 can associate a time interval of 200 ms. Thus, the computer system 102 can execute the resize timer to transmit a first notification to check for resize activity after 200 ms. At a second instance that follows the first instance, the computer system 102 can increase the time interval, e.g., to 400 ms. Thus, the computer system 102 can execute the resize timer to transmit a second notification to check for resize activity after 400 ms. At a third instance that follows the second instance, the computer system 102 can increase the time interval, e.g., to 600 ms. Thus, the computer system 102 can execute the resize timer to transmit a third notification to check for resize activity after 600 ms. In this example, by gradually increasing the time interval associated with the resize timer, the computer system 102 can execute the resize timer only twice (i.e., once at 200 ms, then at 600 ms). In this manner, the computer system 102 can further decrease system resources and battery power to execute the resize timer.

In some implementations, the interval associated with the resize timer can be determined based on types of past resize activities. For example, in response to detecting a resize activity, the computer system 102 can determine a past activity that lead to a resize. If a type of the past resize activity is the same as a type of the recently detected resize activity, then the computer system 102 can associate a time interval with the recently detected resize activity that is substantially similar to (e.g., the same as) the time interval associated with the past resize activity. In this manner, the computer system 102 can obtain some form of feedback from an earlier detection of resize activity, and accordingly associate time intervals to resize timers.

If the difference is greater than or equal to the threshold inactivity time (decision branch "NO" at 310), then, at 314, a check can be performed for a presence or absence of resize activity associated with the user interface. For example, the computer system 102 can check to determine if resize activity has been detected after the inactivity time period has expired. If the computer system 102 determines that resize activity has been detected after the inactivity time period has expired (decision branch "YES" at 314), then the resize timer can be continued at 312. For example, the computer system 102 can continue to execute the resize timer either at the same time interval or at gradually increasing time intervals as described above. On the other hand, if the computer system 102 determines that the resize activity has not been detected after the inactivity time period has expired (decision branch "NO") at 314), then a stop of the resize timer can be triggered at 316. For example, because no resize activity has been detected after expiration of the inactivity time period, the computer system 102 can cease to execute the resize timer. In response to detecting a subsequent resize activity, the computer system 102 can again implement process 300. The subsequent resize activity can be one or more of many types. In some implementations, the subsequent resize activity can be input received by the computer system 102 using one of the input devices 110. For example, when the user moves the mouse or prices any key on the keyboard or provides any other input using an input device, the computer system 102 can determine that the subsequent resize activity has occurred. In response, the computer system can implement process 300. In some implementations, the subsequent resize activity can be an operation performed by the computer system 102. For example, the computer system can receive a response from a long-running Ajax request. In response, the computer system 102 can determine that the subsequent resize activity has occurred and implement process 300.

FIGS. 4A and 4B are flowcharts of example processes for operating the resize timer based on activity or inactivity of a computer system. The example processes shown in FIGS. 4A and 4B represent an example of operations performed by a computer system (e.g., the computer system 102 or the mobile computer system 124 or both) in response to detecting or not detecting activity. The activity can be associated with one or more or all of the DOM elements displayed in a user interface (e.g., user interface 112 or user interface 128). As shown in FIG. 4A, the computer system 102 can check for the presence or absence of activity associated with the user interface 112. Activity associated with the user interface 112 can include, e.g., user input (such as movement of a mouse or keyboard or other user input), DOM manipulations, resizing of the user interface 112, change in orientation of the user interface 112, styling changes (CSS) or combinations of them. If the computer system 102 detects no activity for a duration that is greater than or equal to the threshold inactivity time period (e.g., 10 s), then the computer system 102 can stop executing the resize timer. Subsequently, if the computer system 102 detects activity associated with the user interface 112, then the computer system 102 can restart the resize timer. In this manner, the computer system 102 can operate between an active state at 402 and an inactive state at 404.

FIG. 4B shows an example operation of the resize timer based on the presence or absence of activity. At 406, the resize timer waits for a time interval, e.g., 200 ms. Upon expiration of the time interval, at 408, the resize timer checks dimensions of one or more DOM elements. At 410, if a resize of one or more of the DOM elements is detected, then, at 416, a resize event is fired. If, however, no resize is detected at 410, then a check is performed to determine if the system is active at 412. If the system is active at 412, then the resize timer continues to run and the sub-processes 406, 408, 410, 412, and 416 (if appropriate) are implemented. If the system is inactive at 412, then the resize timer waits until the system becomes active again at 414.

In this manner, the computer system 102 can execute the resize timer under certain circumstances such that the resize timer ceases execution in response to not receiving an instruction to restart or continue running. Similarly, the computer system 102 can execute one or more other computer software applications, which, under certain circumstances, can notify or not notify the resize timer to start or restart running Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by data processing apparatus, the method comprising:

triggering a start of a resize timer configured to periodically provide a notification to check for an occurrence of a resize activity of a single, particular document object model (DOM) element in a user interface displayed on a display device, wherein the resize activity affects the particular DOM element, wherein the resize timer is exclusively associated with the particular DOM element, wherein the resize activity comprises a detected change from a first size dimension of the particular DOM element to a different, second size dimension of the particular DOM element, and wherein the particular DOM element comprises a single element of a plurality of elements included in the DOM;

in response to the notification, determining an absence of the resize activity in the user interface associated with and affecting the particular DOM element after a threshold inactivity time period has expired from the start of the resize timer;

triggering a stop of the resize timer in response to determining the absence of the resize activity in the user interface associated with and affecting the particular DOM element after the threshold inactivity time period has expired;

detecting a resize activity in the user interface associated with the particular DOM element after triggering the stop of the resize timer; and triggering a restart of the resize timer to periodically provide the notification to check for resize activity in the user interface associated with the particular DOM element.

2. The method of claim 1, wherein the detected resize activity is associated with a first timestamp at which the resize activity was detected, the method further comprising:

in response to the notification, identifying a second timestamp at which the restart of the resize timer was triggered; and comparing a time difference between the first timestamp and the second timestamp with the threshold inactivity time period.

3. The method of claim 2, further comprising:

determining that the time difference is greater than the threshold inactivity time period; and detecting a presence or absence of resize activity after the second timestamp.

4. The method of claim 3, further comprising, in response to determining that the time difference is greater than the threshold inactivity time period:

determining an absence of resize activity in the user interface associated with the particular DOM element after the second timestamp;

determining that the threshold inactivity time period from the second timestamp has expired; and triggering a stop of the resize timer after the threshold inactivity time period has expired from the second timestamp in response to determining the absence of resize activity after the second timestamp.

5. The method of claim 3, further comprising in response to determining that the time difference is greater than the threshold inactivity:

determining a presence of resize activity after the second timestamp; and continuing to execute the resize timer from the second timestamp to periodically provide the notification to check for resize activity in the user interface associated with the particular DOM element.

6. The method of claim 5, wherein the resize timer defines a resize time interval to periodically check for resize activity in the user interface associated with the particular DOM element, and wherein continuing to execute the resize time from the second timestamp comprises executing the resize timer to periodically check for the resize activity at the resize time interval.

7. The method of claim 5, wherein the resize timer defines a resize time interval to periodically check for resize activity in the user interface associated with the particular DOM element, and wherein continuing to execute the resize time from the second timestamp comprises increasing the resize time interval for successive checks for the resize activity.

8. The method of claim 2, further comprising:

determining that the time difference is less than the threshold inactivity time period; and in response to determining that the time difference is less than the threshold inactivity time period, continuing to execute the resize timer from the second timestamp to periodically associated with the particular DOM element displayed on the display device.

9. The method of claim 1, wherein the resize timer defines a resize time interval to periodically check for resize activity in the user interface associated with the particular DOM element, and wherein the resize time is constant regardless of a type of resize activity.

10. The method of claim 1, wherein the resize timer defines a resize time interval to periodically check for resize activity in the user interface associated with the particular DOM element, and wherein the resize time is variable according to a type of resize activity, wherein the type of resize activity results from at least one of an internal reason to perform a resizing or an external reason to perform a resizing.

11. The method of claim 1, wherein detecting the first resize activity comprises comparing a type of the first resize activity with a type of a previous resize activity that preceded the first resize activity, and wherein triggering the restart of the resize timer comprises triggering the restart based on determining that the resize activity is substantially similar to the previous resize activity.

12. A non-transitory computer-readable medium storing instructions executable by data processing apparatus to perform operations comprising:

associating a resize timer with a single, particular data object model (DOM) element included in a DOM representing a user interface displayed in a display device, wherein the resize timer is configured to periodically provide a notification to check for an occurrence of a resize activity associated with the particular DOM element, wherein the resize activity affects the particular DOM element, wherein the resize timer is exclusively associated with the particular DOM element, wherein the resize activity comprises a detected change from a first size dimension of the particular DOM element to a different, second size dimension of the particular DOM element, and wherein the particular DOM element comprises a single element of a plurality of elements included in the DOM;

in response to receiving multiple notifications from the resize timer starting at a first time, periodically checking for and determining an absence of resize activity associated with and affecting the particular DOM element for a threshold inactivity time period starting at the first time;

triggering a stop of the resize timer in response to determining the absence of resize activity associated with and affecting the particular DOM element after the threshold inactivity time period has expired;

detecting a first resize activity associated with and affecting the particular DOM element after triggering the stop of the resize timer, the first resize activity associated with a first timestamp at which the first resize activity was detected; and triggering a restart of the resize timer associated with the particular DOM element from the first timestamp to periodically provide the notification to check for resize activity in the user interface associated with and affecting the particular DOM element.

13. The medium of claim 12, the operations further comprising:

in response to a notification to check for resize activity, identifying a second timestamp at which a second resize activity associated with the particular DOM element was detected;

comparing a time difference between the first timestamp and the second timestamp with the threshold inactivity time period; and either triggering a stop of the resize timer or continuing to execute the resize timer based on a result of the comparing and based on detecting a presence or absence of resize activity associated with the particular DOM element.

14. The medium of claim 13, the operations further comprising based on the result of the comparing, determining that the time difference is greater than the threshold inactivity time period; and
wherein either triggering a stop of the resize timer associated with the particular DOM element or continuing to execute the resize timer associated with the particular DOM element based on a result of the comparing and based on detecting a presence or absence of resize activity associated with the particular DOM element comprises:
determining an absence of resize activity after the second timestamp;
determining that the threshold inactivity time period from the second timestamp has expired; and
triggering a stop of the resize timer associated with the particular DOM element after the threshold inactivity time period has expired from the second timestamp in response to determining that the time difference is greater than the threshold inactivity time period and the absence of the resize activity after the second resize activity.

15. The medium of claim 13, the operations further comprising based on the result of the comparing, determining that the time difference is greater than the threshold inactivity time period; and
wherein either triggering a stop of the resize timer or continuing to execute the resize timer based on detecting a presence or absence of resize activity associated with the particular DOM element comprises:
determining a presence of resize activity after the second timestamp; and
continuing to execute the resize timer associated with the particular DOM element from the second timestamp to periodically provide the notification to check for resize activity associated with the particular DOM element in response to determining that the time difference is greater than the threshold inactivity time period and the presence of the resize activity after the second resize activity.

16. The medium of claim 13, the operations further comprising:
based on the result of the comparing, determining that the time difference is less than the threshold inactivity time period; and
in response to determining that the time difference is less than the threshold inactivity time period, continuing to execute the resize timer from the second timestamp to periodically provide the notification to check for resize activity associated with the particular DOM element.

17. A system comprising:
data processing apparatus; and
a computer-readable medium storing instructions executable by the data processing apparatus to perform operations comprising:
associating a resize timer with a single, particular data object model (DOM) element included in a DOM representing a user interface displayed in a display device, wherein the resize timer is configured to periodically provide a notification to check for an occurrence of a resize activity associated with the particular DOM element, wherein the resize activity affects the particular DOM element, wherein the resize timer is exclusively associated with the particular DOM element, wherein the resize activity comprises a detected change from a first size dimension of the particular DOM element to a different, second size dimension of the particular DOM element, and wherein the particular DOM element comprises a single element of a plurality of elements included in the DOM;
in response to receiving multiple notifications from the resize timer starting at a first time, periodically checking for and determining an absence of resize activity associated with and affecting the particular DOM element for a threshold inactivity time period starting at the first time;
triggering a stop of the resize timer in response to determining the absence of resize activity associated with and affecting the particular DOM element after the threshold inactivity time period has expired;
detecting a first resize activity associated with and affecting the particular DOM element after triggering the stop of the resize timer, the first resize activity associated with a first timestamp at which the first resize activity was detected; and
triggering a restart of the resize timer associated with the particular DOM element from the first timestamp to periodically provide the notification to check for resize activity in the user interface associated with and affecting the particular DOM element.

18. The system of claim 17, wherein the resize timer defines a resize time interval to periodically check for resize activity associated with the particular DOM element, and wherein the resize time is constant regardless of a type of resize activity.

19. The system of claim 17, wherein the resize timer defines a resize time interval to periodically check for resize activity associated with the particular DOM element, and wherein the resize time is variable according to a type of resize activity, wherein the type of resize activity results from at least one of an internal reason to perform a resizing or an external reason to perform a resizing.

20. The system of claim 17, wherein detecting the first resize activity comprises comparing a type of the first resize activity with a type of a previous resize activity that preceded the first resize activity, and wherein triggering the restart of the resize timer from the first timestamp comprises triggering the restart based on determining that the first resize activity is substantially similar to the previous resize activity.

* * * * *